United States Patent
Wang et al.

(10) Patent No.: US 11,485,897 B1
(45) Date of Patent: Nov. 1, 2022

(54) TERNARY WATER CONTROL AND GAS RECOVERY METHOD SUITABLE FOR UNCONSOLIDATED SILTSTONE GAS RESERVOIR

(71) Applicant: China University of Petroleum(East China), Qingdao (CN)

(72) Inventors: Fuhua Wang, Qingdao (CN); Luyi Wang, Qingdao (CN); Weidong Zhang, Qingdao (CN); Haitao Zhu, Qingdao (CN); Zezhuang Sun, Qingdao (CN); Zhihao Zhang, Qingdao (CN); Zhizun Wang, Qingdao (CN); Dunyuan Yu, Qingdao (CN); Yang Wang, Qingdao (CN); Haiyang Liu, Qingdao (CN)

(73) Assignee: CHINA UNIVERSITY OF PETROLEUM(EAST CHINA), Qingdao (CN)

( * ) Notice: Subject to any disclaimer, the term of this patent is extended or adjusted under 35 U.S.C. 154(b) by 0 days.

(21) Appl. No.: 17/698,223

(22) Filed: Mar. 18, 2022

(30) Foreign Application Priority Data

Apr. 9, 2021 (CN) .......................... 2021103818498

(51) Int. Cl.
| | |
|---|---|
| *C09K 8/506* | (2006.01) |
| *C09K 23/54* | (2022.01) |
| *E21B 43/08* | (2006.01) |

(52) U.S. Cl.
CPC .............. *C09K 8/506* (2013.01); *C09K 23/54* (2022.01); *E21B 43/086* (2013.01)

(58) Field of Classification Search
CPC ........ C09K 8/506; C09K 23/54; E21B 43/086
See application file for complete search history.

(56) References Cited

U.S. PATENT DOCUMENTS

| | | | | |
|---|---|---|---|---|
| 4,655,287 A | * | 4/1987 | Wu ........................ | C08G 75/04 166/371 |
| 5,084,210 A | * | 1/1992 | Teeters ..................... | C09K 8/54 507/939 |

(Continued)

FOREIGN PATENT DOCUMENTS

| | | |
|---|---|---|
| CN | 102242363 A | 11/2011 |
| CN | 107882537 A | 4/2018 |

OTHER PUBLICATIONS

English translation of Cn 107882537A printed Jul. 28, 22 (Year: 2022).*

(Continued)

*Primary Examiner* — Alicia Bland
(74) *Attorney, Agent, or Firm* — WPAT, PC

(57) ABSTRACT

A ternary water control and gas recovery method suitable for an unconsolidated siltstone gas reservoir is provided. It includes the following steps: first, running a silt control screen pipe manufactured by an interface hydrophobic modification into a wellbore to realize wellbore water control and silt control; second, filling a surface hydrophobic modified gravel in an annular space between the silt control screen pipe and the wellbore to form a hydrophobic gravel packing layer for water control and silt control; third, injecting a wetting agent aqueous solution into a stratum, and performing a hydrophobic modification on a gas reservoir seepage channel surface to realize in-situ waterblocking and silt migration of the unconsolidated siltstone gas reservoir, and then closing a well for a preset time before exploitation.

2 Claims, 2 Drawing Sheets

(56) References Cited

U.S. PATENT DOCUMENTS

2017/0190961 A1* 7/2017 Nguyen ................ C09K 8/805
2018/0142539 A1* 5/2018 Hurst .................... E21B 43/04
2020/0369951 A1* 11/2020 Quraishi ................ E21B 43/26

OTHER PUBLICATIONS

Liu Xiange et al., "Overview of Water Plugging Technologies in China's Oilfields", Oilfield Chemistry, Sep. 30, 1992, pp. 180-187, No. 2.
Liu Zhihui et al., "Research Progress of Mannich Base Acidizing Corrosion Inhibitors", Applied Chemical Industry, Jan. 31, 2014,pp. 148-155, vol. 43, No. 1.

* cited by examiner

TERNARY WATER CONTROL AND GAS RECOVERY METHOD SUITABLE FOR UNCONSOLIDATED SILTSTONE GAS RESERVOIR

CROSS-REFERENCE TO RELATED APPLICATION

This disclosure claims priority from Chinese Patent Application No. 202110381849.8, filed on Apr. 9, 2021, the contents of which are hereby incorporated by reference.

TECHNICAL FIELD

The disclosure relates to the field of water control technologies suitable for unconsolidated siltstone gas reservoirs, and in particular to a ternary water control and gas recovery method suitable for an unconsolidated siltstone gas reservoir.

BACKGROUND

In middle and late stages of exploitation of unconsolidated siltstone gas reservoirs, there are widespread problems of water and silt infiltration, and even some gas wells are blocked by flooding, resulting in silt layer blockage and production string blockage, which seriously affects the normal production of gas wells. Gas reservoir effluent is mainly edge water fingering and bottom water ridge. On the one hand, the gas reservoir effluent will cause a single-phase flow to become a multiphase flow under a water flooding condition, resulting in decrease of effective permeability of natural gas. On the other hand, the gas reservoir effluent may loose the skeleton structure of clay cementation and cause a hydration expansion and hydration dispersion of clay minerals, and then migration of fine silt and argillaceous clay mineral particles occurs, blocking the pore throats or migrating to the wellbore to create a silt buried production layer, resulting in a sharp decline in gas well production and even shutdown. The production practice shows that the root cause of silt blockage is production layer effluent, and with the increase of the production layer effluent, the output of silt is significantly increased.

In response to the above problems, a series of measures such as water control, silt control, blocking removal, drainage and gas recovery have been implemented in the whole world. Although it is worked in some circumstances, the effect of the above approaches cannot meet the requirements for unconsolidated siltstone gas production. Therefore, it is urgent to develop a water-control gas recovery technology suitable for the unconsolidated siltstone gas reservoirs.

SUMMARY

The purpose of the present disclosure is to provide a ternary water control and gas recovery method suitable for an unconsolidated siltstone gas reservoir, aiming at the above-mentioned defects in the prior art. The method is simple in process operation, which may not only increase capillary resistance to slow down or prevent the bottom water ridge and the edge water fingering in the gas recovery process, but also reduce hydration expansion and hydration dispersion of clay after the gas reservoir is flooded. The method may also prevent migration of mud and silt particles from blocking the natural gas seepage channel, so as to achieve the purposes of water control, mud and silt blocking and increasing a recovery ratio of the unconsolidated siltstone gas reservoir.

The disclosure relates to a ternary water control and gas recovery method suitable for an unconsolidated siltstone gas reservoir, and its technical solution includes the following steps:

first, wellbore water and silt control including running a silt control screen pipe manufactured by an interface hydrophobic modification into a wellbore to realize the wellbore water and silt control;

second, artificial bottom hole water and silt control including: filling a surface hydrophobic modified gravel into the annular space between the silt control screen pipe and the wellbore to form a hydrophobic gravel packing layer for water control and silt control; and third, water and silt control in stratum including: injecting a wetting agent aqueous solution into the stratum, performing a hydrophobic modification on the gas reservoir seepage channel surface to realize in-situ waterblocking and sand control of the unconsolidated siltstone gas reservoir, and then closing a well for a preset time before exploitation.

In an embodiment, the silt control screen pipe manufactured by the interface hydrophobic modification adopts a plasma slotted screen pipe, and in the step of processing plasma slotted screen pipe, a special water-based cutting fluid is used to realize hydrophobic modification of an inner surface of a slot cavity during a formation of the slot cavity.

In an embodiment, the hydrophobic modification adopts a compound comprising polyoxyethylene rosin amine and octyne alcohol ($C_8H_{14}O$) with a mass ratio in a range of 6:4-4:6 and an effective concentration is in a range of 3%-5% in terms of w/w.

In an embodiment, the surface hydrophobic modified gravel is one of quartz sand hot coated phenolic resin and quartz sand cold coated with epoxy resin.

In an embodiment, the wetting agent aqueous solution is one of an alkyl halogenated silane and a cationic surfactant with a concentration in range of 0.1%-0.5% in terms of w/w.

In an embodiment, a general formula of the alkyl halogenated silane is $R_nSiX_{4-n}$, where R is alkyl, X is halogen, and n is an integer in a range of 1-3.

In an embodiment, the alkyl halogenated silane is one or more selected from a group consisting of dimethyl ethyl monochlorosilane, dodecyl dimethyl monochlorosilane, diethyl dichlorosilane, dipropyldichlorosilane, dipentyl dichlorosilane, diphenyl dichlorosilane, methyl trichlorosilane, ethyl trichlorosilane and phenyl trichlorosilane.

In an embodiment, the cationic surfactant is one selected from a group consisting of dodecyl chloride/pyridine bromide (i.e., dodecylpyridinium bromide, dodecylpyridinium chloride), hexadecyl chloride/pyridine bromide (i.e., hexadecylpyridinium bromide, hexadecylpyridinium chloride) and octadecyl chloride/pyridine bromide (i.e., octadecylpyridinium bromide, octadecylpyridinium chloride).

Compared with the prior art, the disclosure has the following beneficial effects:

(1) principle of the wellbore water control and silt control: in the step of processing the plasma slotted screen pipe, the compound of polyoxyethylene rosin amine and octyne alcohol is used to form an adsorption film and a mesophase anticorrosive layer on the inner surface of the slot cavity in trapezoidal, which may not only increase hydrophobicity of the inner surface of the slot cavity in trapezoidal, but also enhance its corrosion resistance. On the one hand, capillary resistance of stratum water passing through the slit is increased; on the other hand, a unique structure of the slot cavity in trapezoidal may effectively prevent mud and silt from entering the wellbore, and realize water and silt control by the silt control screen pipe of the wellbore;

(2) principle of the artificial water control and silt control in bottom hole: phenolic resin or epoxy resin is coated on a gravel surface for hydrophobic modification, and then the surface hydrophobic modified gravel is filled into the annular space between silt control screen pipe and the wellbore to form the hydrophobic gravel packing layer with a certain permeability, which increases capillary seepage resistance of the stratum water through the layer; at the same time, fine silt particles are able to pass through the hydrophobic gravel packing layer, and large silt particles are prevented from entering the layer, forming a water and silt barrier;

(3) principle of the water control and silt control in stratum: siltstone and clay in the unconsolidated siltstone gas reservoir are characterized by hydroxylation and electronegative surface in water phase. The alkyl halogenated silane may react with alkyl groups on the surface of siltstone or clay and connect to it through covalent bonds, thus the surface of siltstone or clay may be transformed into hydrophobic and oleophilic surface. The cationic surfactant may react with the negative surface of siltstone or clay and connect to it through ionic bonds, thus the surface of siltstone or clay may be transformed into hydrophobic and oleophilic surface. The reversal phenomenon of hydrophilicity to lipophilicity caused by the reaction between the wetting agent aqueous solution and the seepage channel surface of unconsolidated siltstone and pore filler-sand-mud particle surface may produce two effects: one is reversing the capillary driving force (capillary rising phenomenon) into the resistance (capillary falling phenomenon) of preventing stratum water from entering the gas reservoir, which may slow down or prevent bottom and edge water fingering under the same exploitation pressure difference; and the other is weakening the hydration expansion and hydration dispersion properties and greatly reducing migration degree of particles after the surface wetting reversal of silt and mud particles. Pore throat shrinkage caused by hydration expansion, stratum blockage caused by hydration dispersion and particle migration may be effectively reduced to make the stratum more stable, ensuring the original permeability of gas reservoirs and fundamentally reform the stratum.

In summary, the process operation of the disclosure is simple, which not only may effectively control the sharp reduction of natural gas output caused by water discharge from the unconsolidated siltstone gas reservoir, but also may prevent the migration of stratum silt particles caused by water discharge from the gas reservoir from blocking the natural gas seepage channel, so as to ensure the stable and increased production of the unconsolidated siltstone gas reservoir.

DETAILED DESCRIPTION OF THE EMBODIMENTS

Figure 1:
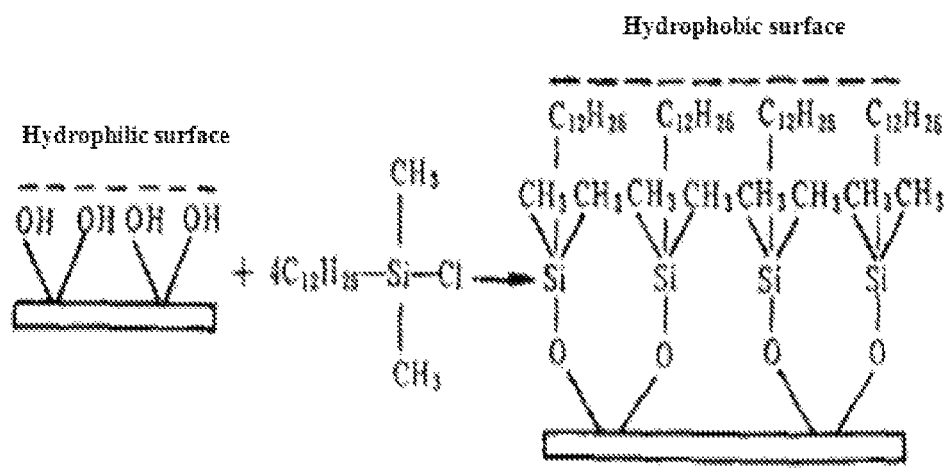
FIG. 1 shows a reaction formula of alkyl halogenated silane and alkyl groups on a surface of siltstone or clay of the present disclosure.
Figure 2:
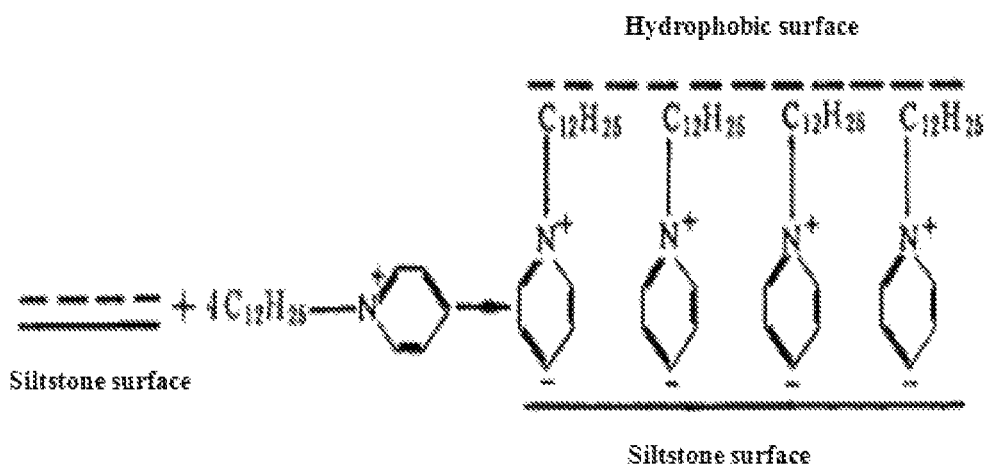
FIG. 2 shows a reaction formula of a cationic surfactant and a negative surface of siltstone or clay.

The illustrated embodiments of the present disclosure will be described with reference to the accompanying drawings below. It should be understood that the illustrated embodiments described here are only used to illustrate and explain the present disclosure, and are not used to limit the present disclosure.

Embodiment 1: an interfacial chemical ternary water control and gas recovery technology suitable for unconsolidated siltstone gas reservoirs mentioned in the present disclosure, including:

firstly, wellbore water control and silt control running a silt control screen pipe manufactured by an interface hydrophobic modification into a wellbore to realize the wellbore water control and silt control;

secondly, artificial water control and silt control in a bottom hole: filling a surface hydrophobic modified gravel into an annular space between the silt control screen pipe and the wellbore to form a hydrophobic gravel packing layer for water control and silt control; and thirdly, water control and silt control in a stratum: injecting a wetting agent aqueous solution into the stratum, performing a hydrophobic modification on a gas reservoir seepage channel surface to realize in-situ waterblocking and silt migration of the unconsolidated siltstone gas reservoir, and then closing a well for a preset time before exploitation.

The water control and silt control in the stratum is a main technical measure, and the artificial water control and silt control in the bottom hole is an auxiliary technical measure.

The silt control screen pipe used in the wellbore water and silt control adopts a compound including polyoxyethylene rosin amine and octyne alcohol ($C_8H_{14}O$) as a hydrophobic modifier of an inner surface of a slot cavity, with a mass ratio of 6:4 and an effective concentration of 5% in terms of w/w.

The surface hydrophobic modified gravel for the artificial water control and silt control in the bottom hole is quartz sand hot coated phenolic resin.

The wetting agent aqueous solution for the water control and silt control in the stratum is dodecyl dimethyl monochlorosilane with a concentration of 0.2% in terms of w/w, an injection volume of 0.8 PV, and normal gas recovery starts after 24-48 hours of well shutdown.

The evaluation of the disclosure is as follows:

(1) Wettability Modification Effect:

① Evaluation of wetting degree of the silt control screen pipe: measuring a contact angle of a cutting fluid on a surface of a metal test piece. The surface of the metal test piece is hydrophilic when the contact angle is less than 90°, the surface of the metal test piece is a neutral wetting surface when the contact angle is about 90°, and the surface of the metal test piece is hydrophobic when the contact angle is greater than 90°. A silt control slotted screen pipe is prepared by plasma slotted on a base pipe of N80 steel, thus contact angle measurement of N80 steel test piece is used to evaluate the hydrophobic modification effect of the inner surface. The test results show that the contact angle is 27.6° when the compound of polyoxyethylene rosin amine and octyne alcohol are not added into the cutting fluid; and the contact angle is 128.4° when the compound is added into the cutting fluid. Therefore, the 5% compound of polyoxyethylene rosin amine and octyne alcohol (mass ratio of 6:4) has an excellent hydrophobic modification behavior.

② evaluation of the wettability of gravel and silt particles: the wettability of silt particles is evaluated by particle wettability index. The expression of particle wetting index R is as follows:

$$R(\theta, H) = \begin{cases} \dfrac{1+\overline{\varepsilon}_H}{2} \cdot \dfrac{\theta}{\pi} + \dfrac{1-\overline{\varepsilon}_H}{2} \cdot H & H < 0.3 \\ \dfrac{1}{2} \cdot \dfrac{\theta}{\pi} + \dfrac{H}{2} & 0.3 \le H < 1 \\ \dfrac{\theta}{\pi} & H = 1 \end{cases}$$

where $\theta$ is a contact angle measured on a flat plate of the silt particles, radian; H is a measured activation index; and $\overline{\varepsilon}_H$ is an average relative error between the measured activation index and a fitting theoretical value, $\overline{\varepsilon}_H = 0.305$.

The wetting index R of the silt particles ranges from 0 to 1. The closer the R value is to 1, the more hydrophobic the particles are. The closer the R value is to 0, the more hydrophilic the particles are. The evaluation criteria of particle wettability are shown in Table 1.

TABLE 1

| Evaluation criteria of particle wettability | | | |
|---|---|---|---|
| Wetting index R | 0-0.42 | 0.42-0.58 | 0.58-1.0 |
| Wetting degree | Hydrophilic | Neutral wetting | Hydrophobic |

Figure 3:
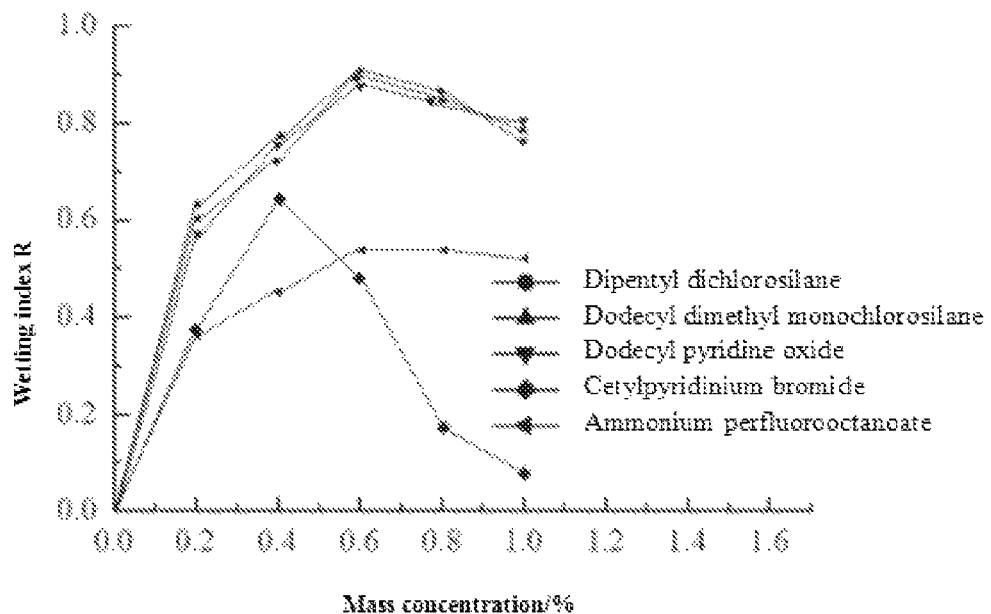
FIG. 3 is a schematic diagram of a wetting index of silt particles at different reagent concentrations.

When wettability modification is performed on the surfaces of silt particles with a concentration of 0.2% dodecyl dimethyl monochlorosilane, the R value is 0.68, and the degree of hydrophobicity is reached, as shown in FIG. 3. The wetting agent is dodecyl dimethyl monochlorosilane, among which ammonium perfluorooctanoate has a worst effect at present.

(2) Water-Blocking Effect of Gravel Layer:

The water resistance of hydrophobic gravel layer mainly comes from the capillary force generated by gravel packing layer. The water resistance $\delta$ of gravel layer may be expressed by the following formula:

$$\delta = \frac{Q_{w,i} - Q_{w,fm}}{Q_{w,i}};$$

where $Q_{w,i}$ represents a water production rate when filling conventional gravel ($\theta = 0°$), milliliter per minute (mL·min$^{-1}$); $Q_{w,fm}$ represents a water production rate when filling hydrophobic gravel, mL·min$^{-1}$.

The conventional gravel and quartz sand hot coated phenolic resin (i.e., modified gravel) are packed into a sand filling pipe, compacted, and then connected to a core flow tester to test the water production rates respectively. The results are shown in FIG. 4 (contact angle is 120°).

Figure 4:
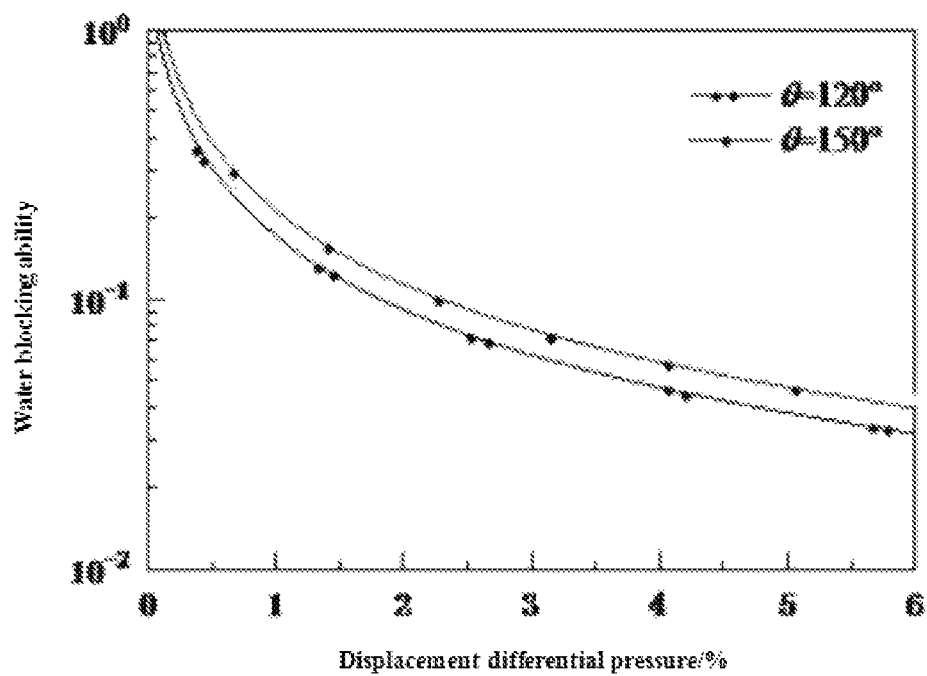
FIG. 4 shows a relation curve graph of a water-blocking ability and a displacement pressure difference of a hydrophobic gravel packing layer under different gravel wettability.

It may be seen from FIG. 4 that in the range of displacement pressure difference less than 1 megapascal (MPa), the modified gravel layer has a large water-blocking capacity; with the increase of displacement pressure difference, the water-blocking effect of gravel layer becomes worse. In addition, once the hydrophobic degree is reached, the increasing contact angle has negligible influence on the water-blocking ability.

(3) Effect of Prevention and Control of Silt Particle Migration:

In order to evaluate the effect of controlling the migration and blockage of silt particles, a silt filling pipe (Φ25 millimeters (mm)×320 mm in size) is designed to replace a core holder, and a filling sequence of the silt filling pipe is the particles in reservoir, the modified gravel, and a slit steel plate (the thickness is the same as that of slotted screen pipe base pipe). The critical velocity $v_c$, the permeability damage rate $D_r$, the silt production $m_s$ and the silt production reduction rate $m_r$ of a core column of mud siltstone in silt filling pipe are tested by the core flow tester. In the experiment, firstly, injecting the wetting agent aqueous solution forward (slit steel plate→gravel interval→silt particles interval), and after closing the valve for a certain period of time, opening the valve, and then using the simulated stratum water (or normal saline) to reverse displace the core, and measuring the permeability of the core and other parameters. The specific experimental method is implemented according to the oil and gas industry standard of the People's Republic of China, *Formation damage evaluation by flow test* (SY/T 5358-2010).

The larger the critical velocity $v_c$ of the siltstone core column in the silt filling pipe, the smaller the permeability damage rate $D_r$, the smaller the silt production and the larger the silt production reduction rate $m_r$, the better the prevention and control effect of silt migration and blockage.

The experimental results are shown in Table 2 and the embodiment 1.

The data in Table 2 shows that silt blockage control is realized as expected.

Table 2 Experimental data of prevention and control effect evaluation of silt migration and blockage

TABLE 2

| | | Control effect | | | |
|---|---|---|---|---|---|
| Embodiment | Basic parameters of mud siltstone core column | $V_c$/(mL·min$^{-1}$) | $D_r$/% | $m_s$/g | $m_r$/% |
| 1 | φ = 34.6%, k = 1738.4 × 10$^{-3}$ μm$^2$ | 0.69 | 20.2 | 2.9 | 68.5 |
| 2 | φ = 36.2%, k = 1922.6 × 10$^{-3}$ μm$^2$ | 0.72 | 17.8 | 2.5 | 72.8 |
| 3 | φ = 31.7%, k = 1527.3 × 10$^{-3}$ μm$^2$ | 0.68 | 14.6 | 2.8 | 69.6 |
| 4 | φ = 30.4%, k = 1638.5 × 10$^{-3}$ μm$^2$ | 0.63 | 15.3 | 2.7 | 70.7 |
| Reference | φ = 33.8%, k = 1700.9 × 10$^{-3}$ μm$^2$ | 0.17 | 47.8 | 9.2 | 0 |

Embodiment 2, an interfacial chemical ternary water control and gas recovery technology suitable for unconsolidated siltstone gas reservoirs mentioned in the present disclosure mainly includes three units:

firstly, wellbore water control and silt control running a silt control screen pipe manufactured by an interface hydrophobic modification into a wellbore to realize the wellbore water control and silt control;

secondly, artificial water control and silt control in a bottom hole: filling a surface hydrophobic modified gravel in an annular space between the silt control screen pipe and the wellbore to form a hydrophobic gravel packing layer for water control and silt control;

thirdly, water control and silt control in a stratum: injecting a wetting agent aqueous solution into the stratum, performing a hydrophobic modification on a gas reservoir seepage channel surface to realize in-situ waterblocking and silt migration of gas reservoir, and then closing a well for a preset time before exploitation.

The silt control screen pipe used in the wellbore water control and silt control uses a compound including polyoxyethylene rosin amine and octyne alcohol as a hydrophobic modifier of an inner surface of a slot cavity, a mass ratio of them is 5:5, and an effective concentration is 4% in terms of w/w.

The gravel for the artificial water control and silt control in the bottom hole is quartz sand cold coated with epoxy resin.

The wetting agent aqueous solution for the water control and silt control in stratum is a cationic surfactant, specifically dodecyl pyridine chloride, with a concentration of 0.3%, an injection volume of 0.8 PV in terms of w/w, and normal gas recovery starts after shut-in for 24-48 hours.

The evaluation of the embodiment 2 of the present disclosure is as follows:

(1) Wettability Modification Effect:

① Evaluation of wetting degree of the silt control screen pipe: the test results show that the contact angle is 27.6° when the compound of polyoxyethylene rosin amine and octyne alcohol is not added into the cutting fluid; when the complex of polyoxyethylene rosin amine and octyne alcohol is added into a cutting fluid, the contact angle is 133.6°. Therefore, 4% compound of polyoxyethylene rosin amine and octyne alcohol (mass ratio of 5:5) has a good hydrophobic modification effect.

② Evaluation of the wettability of gravel and silt particles: when wettability modification is performed on the surfaces of silt particles with a concentration of 0.3% dodecyl pyridine chloride, its R value is 0.66, which means the silt particles reach the hydrophobicity, as shown in FIG. 3. The wetting agent is dodecyl pyridine chloride, among which ammonium perfluorooctanoate has the worst effect.

(2) Water-Blocking Effect of Gravel Layer:

The conventional gravel and quartz sand cold coated with epoxy resin are packed into a silt filling pipe, compacted, and then connected to a core flow tester to test the water production rates respectively. The results are shown in FIG. 4 (contact angle θ is 150°).

It may be seen from FIG. 4 that in the range of displacement pressure difference less than 1 megapascal (MPa), the modified gravel layer has a large water-blocking capacity; with the increase of displacement pressure difference, the water-blocking effect of gravel layer becomes worse. In addition, once the hydrophobic degree is reached, the increasing contact angle has negligible influence on the water-blocking ability.

(3) Effects of Prevention and Control of Silt Particle Migration:

The evaluation data is seen in Table 2. According to the technical solution of the embodiment 2, the expected effect of controlling silt blockage may be achieved.

Embodiment 3

The interface chemical ternary water control and gas recovery technology suitable for unconsolidated siltstone gas reservoirs mentioned by the disclosure mainly includes three units:

firstly, wellbore water control and silt control running a silt control screen pipe manufactured by an interface hydrophobic modification into a wellbore to realize the wellbore water and silt control;

secondly, artificial water control and silt control in a bottom hole: filling a surface hydrophobic modified gravel in an annular space between the silt control screen pipe and the wellbore to form a hydrophobic gravel packing layer for water control and silt control; and thirdly, water control and silt control in a stratum: injecting a wetting agent aqueous solution into the stratum, performing a hydrophobic modification on a gas reservoir seepage channel surface to realize in-situ waterblocking and silt migration of gas reservoir, and then closing a well for a preset time before exploitation.

The silt control screen pipe used in the wellbore water control and silt control uses a compound including polyoxyethylene rosin amine and octyne alcohol as a hydrophobic modifier of an inner surface of a slot cavity, a mass ratio of them is 4:6, an effective concentration is 3%, and in terms of w/w.

The gravel for the artificial water control and silt control in the bottom hole is quartz sand cold coated with epoxy resin.

The wetting agent aqueous solution for water control and silt control in stratum is cetylpyridinium bromide with a concentration of 0.4%, in terms of w/w, an injection volume of 0.8 PV, and normal gas recovery starts after shut-in for 24-48 hours.

(1) Wettability Modification Effects

① Evaluation of wetting degree of silt control screen: the test results show that the contact angle is 27.6° when the compound of polyoxyethylene rosin amine and octyne alcohol is not added into a cutting fluid; when the compound of polyoxyethylene rosin amine and octyne alcohol is added into the cutting fluid, the contact angle is 124.8°. Therefore, the 3% compound of polyoxyethylene rosin amine and octyne alcohol (mass ratio 4:6) has a good hydrophobic modification effect.

② Evaluation of the wettability of gravel and silt particles: when wettability modification is performed on the surfaces of silt particles with a concentration of 0.4% cetylpyridinium bromide, its R value is 0.65, which reaches the degree of hydrophobicity, as shown in FIG. 3. The wetting agent is cetylpyridinium bromide, in which ammonium perfluorooctanoate has the worst effect.

(2) Water-Blocking Effect of Gravel Layer:

The conventional gravel and quartz sand cold coated with epoxy resin are packed into a silt filling pipe, compacted, and then connected to a core flow tester to test the water production rates respectively. The results are shown in FIG. 4 (contact angle θ is 150°).

It may be seen from FIG. 4 that in the range of displacement pressure difference less than 1 MPa, the modified gravel layer has a large water-blocking capacity. In addition, once the hydrophobic degree is reached, the hydrophobic degree continues to increase (the contact angle increases) without having great influence on the water-blocking ability.

(3) Effects of Prevention and Control of Silt Particle Migration:

The evaluation data is seen in the Table 2. According to the technical solution of the embodiment 3, the expected effect of controlling silt blockage may be achieved.

Embodiment 4

The interface chemical ternary water control and gas recovery technology suitable for unconsolidated siltstone gas reservoirs mentioned by the disclosure mainly includes three units:

firstly, wellbore water control and silt control: running a silt control screen pipe manufactured by an interface hydrophobic modification and into a wellbore to realize the wellbore water control and silt control;

secondly, artificial water control and silt control in a bottom hole: filling a surface hydrophobic modified gravel into an annular space between the silt control screen pipe and the wellbore to form a hydrophobic gravel packing layer for water control and silt control; and thirdly, stratum water control and silt control: injecting a wetting agent aqueous solution into a stratum, performing a hydrophobic modification on a gas reservoir seepage channel surface to realize in-situ waterblocking and silt migration of gas reservoir, and then closing a well for a preset time before exploitation.

The silt control screen pipe used in the wellbore water control and silt control uses a compound of polyoxyethylene rosin amine and octyne alcohol as a hydrophobic modifier of an inner surface of a slot cavity, with a mass ratio of 5:5 and an effective concentration of 4% in terms of w/w.

The gravel for the artificial water control and silt control in the bottom hole is quartz sand cold coated with epoxy resin.

The wetting agent aqueous solution for water control and silt control in the stratum is dipentyl dichlorosilane with a concentration of 0.3% in terms of w/w, an injection volume of 0.8 PV, and normal gas recovery starts after shut-in for 24-48 hours.

(1) Wettability Modification Effect:

① Evaluation of the wetting degree of silt control screen pipe: the test results show that the contact angle is 27.6° when the compound of polyoxyethylene rosin amine and octyne alcohol is not added into a cutting fluid; when the compound of polyoxyethylene rosin amine and octyne alcohol is added into the cutting fluid, the contact angle is 133.6°. Therefore, 4% compound of polyoxyethylene rosin amine and octyne alcohol (mass ratio of 5:5) has a good hydrophobic modification effect.

② Evaluation of the wettability of gravel and silt particles: when wettability modification is performed on the surfaces of silt particles with a concentration of 0.3% dipentyl dichlorosilane, its R value is 0.67, and the degree of hydrophobicity is reached. As shown in FIG. 3, the wetting agent is dipentyl dichlorosilane, in which ammonium perfluorooctanoate has the worst effect.

(2) Water-Blocking Effect of Gravel Layer:

The conventional gravel and quartz sand hot coated phenolic resin are packed into a silt filling pipe, compacted, and then connected to the core flow tester to test the water production rates respectively. The results are shown in FIG. 4 (contact angle is) 120°.

It may be seen from FIG. 4 that in the range of displacement pressure difference less than 1 MPa, the modified gravel layer has a large water-blocking capacity. In addition, once the hydrophobic degree is reached, the hydrophobic degree continues to increase (the contact angle increases) without having great influence on the water-blocking ability.

(3) Effects of Prevention and Control of Silt Particle Migration:

Referring to Table 2 for the evaluation data. According to the technical solution of the embodiment 4, the expected effect of controlling silt blockage may be achieved.

The above is only some of the preferred embodiments of the present disclosure, and any person familiar with the field may use the technical schemes described above to modify or change into an equivalent technical scheme. Therefore, the corresponding simple modification or equivalent transformation according to the technical schemes of the present disclosure is within the scope of the present disclosure.

What is claimed is:

1. A ternary water control gas recovery method suitable for an unconsolidated siltstone gas reservoir, comprising:
    first, wellbore water control and silt control comprising: running a silt control screen pipe manufactured by an interface hydrophobic modification into a wellbore to realize the wellbore water control and silt control;
    second, artificial water control and silt control in a bottom hole comprising: filling a surface hydrophobic modified gravel into an annular space between the silt control screen pipe and the wellbore to form a hydrophobic gravel packing layer for water control and silt control; and
    third, water control and silt control in a stratum comprising: injecting a wetting agent aqueous solution into the stratum, performing a hydrophobic modification on a gas reservoir seepage channel surface to realize in-situ water blocking and silt migration of the unconsolidated siltstone gas reservoir, and then closing the wellbore for a preset time before exploitation;
    wherein the silt control screen pipe manufactured by the interface hydrophobic modification adopts a plasma slotted screen pipe, and in a step of processing the plasma slotted screen pipe, a corresponding water-based cutting fluid is used to realize hydrophobic modification of an inner surface of a slot cavity during a formation of the slot cavity;
    wherein the interface hydrophobic modification adopts a compound comprising polyoxyethylene rosin amine and octyne alcohol ($C_8H_{14}O$) with a mass ratio in a range of 6:4-4:6 and an effective concentration of 3%-5% in terms of weight per weight (w/w); in the step of processing the plasma slotted screen pipe, the compound comprising polyoxyethylene rosin amine and octyne alcohol is used to form an adsorption film and a mesophase anticorrosive layer on the inner surface of the slot cavity in trapezoidal to increase hydrophobicity of the inner surface of the slot cavity in trapezoidal and to enhance corrosion resistance of the inner surface of the slot cavity in trapezoidal;
    wherein the surface hydrophobic modified gravel is quartz sand hot coated phenolic resin;
    wherein the wetting agent aqueous solution is alkyl halogenated silane with a concentration in a range of 0.1%-0.5% in terms of w/w; and
    wherein a general formula of the alkyl halogenated silane is $R_nSiX_{4-n}$, where R is alkyl, X is halogen, and n is an integer in a range of 1-3.
2. The ternary water control and gas recovery method according to claim 1, wherein the alkyl halogenated silane is one or more selected from a group consisting of dimethyl ethyl monochlorosilane, dodecyl dimethyl monochlorosilane, diethyl dichlorosilane, dipropyldichlorosilane, dipentyl dichlorosilane, diphenyl dichlorosilane, methyl trichlorosilane, ethyl trichlorosilane and phenyl trichlorosilane.

\* \* \* \* \*